United States Patent
Ikawa et al.

(10) Patent No.: US 7,948,696 B2
(45) Date of Patent: May 24, 2011

(54) OBJECTIVE LENS ACTUATOR AND METHOD OF MANUFACTURING THE OBJECTIVE LENS ACTUATOR

(75) Inventors: Yoshihiro Ikawa, Osaka (JP); Mamoru Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 105 days.

(21) Appl. No.: 12/482,970

(22) Filed: Jun. 11, 2009

(65) Prior Publication Data

US 2009/0310233 A1 Dec. 17, 2009

(30) Foreign Application Priority Data

Jun. 12, 2008 (JP) ................................. 2008-153822
Jun. 4, 2009 (JP) ................................. 2009-134561

(51) Int. Cl.
*G02B 7/02* (2006.01)
(52) U.S. Cl. ..................................... 359/824; 369/44.15
(58) Field of Classification Search .................. 359/811, 359/824
See application file for complete search history.

(56) References Cited

U.S. PATENT DOCUMENTS

2008/0030880 A1* 2/2008 Takahashi ..................... 359/814

FOREIGN PATENT DOCUMENTS

| JP | 58-158992 | 9/1983 |
|---|---|---|
| JP | 06-151228 | 5/1994 |
| JP | 07-220297 | 8/1995 |
| JP | 08-249691 | 9/1996 |
| JP | 10-069655 | 3/1998 |
| JP | 11-175993 | 7/1999 |
| JP | 2000-222753 | 8/2000 |
| JP | 2001-52357 | 2/2001 |
| JP | 2006-134411 | 5/2006 |

* cited by examiner

*Primary Examiner* — Ricky L Mack
*Assistant Examiner* — James C Jones
(74) *Attorney, Agent, or Firm* — Hamre, Schumann, Mueller & Larson, P.C.

(57) ABSTRACT

In an objective lens actuator of an optical disk drive and the like, variations in the fixed end positions of wires serving as suspensions are reduced and tilt characteristics are improved. When wires 13 are fixed by soldering, a deformation caused by soldering on the wires 13 is minimized by providing heat absorbing members 25 and 26 which hold the wires 13 near soldering positions to absorb soldering heat.

6 Claims, 12 Drawing Sheets

OBJECTIVE LENS ACTUATOR AND METHOD OF MANUFACTURING THE OBJECTIVE LENS ACTUATOR

FIELD OF THE INVENTION

The present invention relates to an objective lens actuator and particularly relates to an objective lens actuator used for an optical pickup device and the like of an optical disk drive for irradiating a disk, which is a disk-like recording medium, with a light beam to record and reproduce information optically.

BACKGROUND OF THE INVENTION

An optical pickup device is used for an optical disk drive that irradiates a disk such as a CD, a DVD, a Blu-ray disc, and an HD-DVD disc with a light beam spot to record and reproduce information made up of pit strings on the recording surface of the disk. An optical pickup device has an objective lens actuator for driving an objective lens used for forming a light beam spot.

In recent years, an optical disk drive focuses a light beam spot by using an objective lens having a high numerical aperture (high NA) and records and reproduces data having been recorded with high densities. Thus objective lenses having small inclinations relative to disks have been demanded.

In other words, for an objective lens actuator, a smaller tilt and a smaller reduction in the aberration of a light beam spot have been demanded. A tilt is a rotary motion made beyond a focusing direction and a tracking direction when a lens holder for holding an objective lens is driven.

Japanese Patent Laid-Open No. 2006-134411 discloses an optical pickup device for reducing a tilt, which is a rotary motion made other than a focusing direction and a tracking direction when a lens holder is driven, along with the configuration of a typical objective lens actuator.

First, the configuration of the typical objective lens actuator will be described below in accordance with an accompanying drawing. FIG. 12 is a perspective view showing the typical objective lens actuator according to the prior art. As shown in FIG. 12, an objective lens 51 is held by a lens holder 52 on which terminal plates 53 are fixed.

A fixed substrate 59 is fixed on a fixed part 57. One end 54b of each of a plurality of wires 54 serving as suspension members is fixed to the fixed substrate 59 by soldering with solder 56. The other end 54a of each of the plurality of wires 54 is fixed to the terminal plates 53 of the lens holder 52 by soldering with solder 55.

The objective lens 51 and the lens holder 52 (including the terminal plates 53) are formed integrally and constitute a moving part while being supported by the fixed substrate 59 with elasticity through the wires 54. The fixed part 57 has gaps serving as gel holder parts 58. The gaps are filled with damping gel (vibration damping gel) with the wires 54 passed through the gaps, and the damping gel damps the primary mode vibration of the moving part.

The moving part including the lens holder 52 can be driven in the direction of arrow Fo which is a focusing direction and in the direction of arrow Tr which is a tracking direction. The fixed part has a magnetic flux supply device (not shown) made up of a magnet and a yoke, and a plurality of coils (not shown) are fixed on the lens holder 52. By energizing the coils through the plurality wires 54, the objective lens 51 (the moving part including the lens holder 52) can be driven in a desired direction.

The foregoing explanation described the configuration of the typical objective lens actuator according to the prior art. In Japanese Patent Laid-Open No. 2006-134411, a technique using a conductive adhesive is disclosed instead of a fixing method using the solder 55 and the solder 56. The main configuration is substantially the same.

DISCLOSURE OF THE INVENTION

As has been indicated in Japanese Patent Laid-Open No. 2006-134411, in the method of fixing the wires serving as suspensions to the terminal plates 53 and the fixed substrate 59 by soldering, the wires 54 expand or contract in the length direction due to the influence of heating and cooling during soldering, so that a tensile or compressive stress remains on the wires after the solder is cooled. This problem results in uneven spring constants due to variations in the bends and lengths of the wires 54, so that a tilt occurs when the lens holder is driven.

Further, a flux is used for soldering. The wires are soldered in a state in which the fixed substrate 59 and the fixed part 57 are fixed. Thus when a flux is scattered in the gaps serving as the gel holder parts 58 during soldering, wires 54 and the gel holder parts 58 of the fixed part 57 may be fixed through the flux on these points. In this case, the vibration damping effect of the damping gel declines and vibration damping characteristics are varied.

In Japanese Patent Laid-Open No. 2006-134411, as a technique for eliminating variations in the bends and lengths of the plurality of wires while fixing the wires by soldering, a technique is disclosed in which the wires are passed through the fixing holes of a supporting part provided on the lens holder and the wires are fixed near soldering points with ultraviolet curing resin filled in the fixing holes, and a technique is disclosed in which electricity is conducted by soldering with a conductive adhesive and the wires are fixed at the same time.

In the optical pickup described in Japanese Patent Laid-Open No. 2006-134411, soldering is not performed during the fixation of the wires. Thus it is possible to somewhat reduce variations in the bends and lengths of the wires.

Generally, adhesives are made of polymeric materials and exhibit less stable long-term performance at a high temperature and a high humidity as compared with metallic materials such as solder, so that a design has to be examined in various ways. Consequently, the adhesives are less usable materials. For this reason, an objective lens actuator for fixing wires by soldering with more excellent characteristics is desirable.

The present invention has been devised under these circumstances. An object of the present invention is to provide an objective lens actuator that can reduce variations in the effective lengths of wires during soldering.

In order to solve the problem, the objective lens actuator of the present invention includes: an objective lens for focusing a light beam on a disk; a lens holder for holding the objective lens; a fixed part; a plurality of wires each having one end fixed to the lens holder with a fixing agent and the other end fixed to the fixed part; and a gel holder that can be mounted on the fixed part, wherein the gel holder is a separate member from the fixed part and can be mounted on the fixed part in a state in which the lens holder is mounted on the fixed part.

Further, the fixed part of the objective lens actuator according to the present invention has a heat absorbing member mountable instead of the gel holder on the fixed part in a state in which the heat absorbing member is in contact with the plurality of wires, the heat absorbing member being made of a material capable of absorbing heat.

As has been discussed, the gel holder is a separated member from the fixed part and can be mounted on the fixed part in a state in which the lens holder is mounted on the fixed part. With this configuration, the heat absorbing members made of a material capable of absorbing heat can be mounted instead of the gel holder on the fixed part in a state in which the heat absorbing members are in contact with the plurality of wires. Therefore, even when using a fixing agent such as solder for bonding with heat, it is possible to fix the wires while bringing the heat absorbing members into contact with the wires to absorb heat, thereby minimizing the influence of heating and cooling during bonding such as soldering. When the wires are fixed using a fixing agent such as solder, the gel holder is not mounted on the fixed part. Thus a flux and the like do not adhere over the gel holder and fixed part when solder is used. After that, even when vibration damping gel is injected into the gel holder, the vibration damping effect of the vibration damping gel does not decline.

Moreover, the fixed part of the objective lens actuator of the present invention has a first holding member mountable instead of the gel holder on the fixed part, the first holding member being capable of holding the plurality of wires with a second holding member. With this configuration, in a state in which the plurality of wires are held satisfactorily by the first holding member and the second holding member, the heat absorbing members can be brought into contact with the plurality of wires by the first holding member and the second holding member or through the first holding member and the second holding member. Thus heat from the wires can be absorbed satisfactorily.

Further, the fixed part of the objective lens actuator according to the present invention has a first holding member mountable instead of the gel holder on the fixed part, the first holding member being capable of holding the plurality of wires one by one with a second holding member. With this configuration, even when the wires vary in thickness, the wires can be held securely one by one and can be soldered while heat from the wires is absorbed satisfactorily.

It is preferable that solder is used as the fixing agent of the objective lens actuator of the present invention. By using solder as the fixing agent, it is possible to satisfactorily keep stable long-term performance even at a high temperature and a high humidity and easily use the fixing agent over quite a wide range of use.

The gel holder of the objective lens actuator according to the present invention has a gel storing portion filled with vibration damping gel, and after the gel holder is mounted on the fixed part, the vibration damping gel can be injected from the gel storing portion. With this configuration, after the gel holder is mounted on the fixed part, the vibration damping gel can be injected satisfactorily from the gel storing portion of the gel holder.

A method of manufacturing the objective lens actuator according to the present invention, the objective lens actuator including: an objective lens for focusing a light beam on a disk; a lens holder for holding the objective lens; a fixed part; a plurality of wires each having one end fixed to the lens holder with a fixing agent and the other end fixed to the fixed part; and a gel holder which can be mounted on the fixed part, includes the steps of: fixing the plurality of wires to the fixed part and the lens holder in a state in which the gel holder is removed from the fixed part; and fixing the gel holder to the fixed part.

According to the method, the heat absorbing members made of a material capable of absorbing heat can be mounted instead of the gel holder on the fixed part in a state in which the heat absorbing members are in contact with the plurality of wires.

A method of manufacturing the objective lens actuator according to the present invention, the objective lens actuator including: an objective lens for focusing a light beam on a disk; a lens holder for holding the objective lens; a fixed part; a plurality of wires each having one end fixed to the lens holder with a fixing agent and the other end fixed to the fixed part; and a gel holder which can be mounted on the fixed part, includes the steps of: allowing a heat absorbing member made of a material capable of absorbing heat to be mounted instead of the gel holder on the fixed part in a state in which the heat absorbing member is in contact with the plurality of wires, and fixing the heat absorbing member to the fixed part; fixing the plurality of wires to the fixed part and the lens holder while bringing the heat absorbing member into contact with the plurality of wires; removing the heat absorbing member from the fixed part; and fixing the gel holder to the fixed part.

According to this method, even when using a fixing agent such as solder for bonding with heat, it is possible to fix the wires while bringing the heat absorbing member into contact with the wires to absorb heat, thereby minimizing the influence of heating and cooling during bonding such as soldering. When the wires are fixed using a fixing agent such as solder, the gel holder is not mounted on the fixed part. Thus a flux and the like do not adhere over the gel holder and the fixed part when solder is used. After that, even when vibration damping gel is injected into the gel holder, the vibration damping effect of the vibration damping gel does not decline.

A method of manufacturing the objective lens actuator according to the present invention, the objective lens actuator including: an objective lens for focusing a light beam on a disk; a lens holder for holding the objective lens; a fixed part; a plurality of wires each having one end fixed to the lens holder with a fixing agent and the other end fixed to the fixed part; and a gel holder which can be mounted on the fixed part, includes the steps of: allowing a holding member for holding the plurality of wires to be mounted instead of the gel holder on the fixed part, and fixing the holding member to the fixed part; fixing the plurality of wires to the fixed part and the lens holder in a state in which the holding member holds the plurality of wires; removing the holding member from the fixed part; and fixing the gel holder to the fixed part.

According to this method, the heat absorbing member can be brought into contact with the plurality of wires in a state in which the holding member satisfactorily holds the plurality of wires. Thus heat from the wires can be absorbed satisfactorily.

Since the holding member holds the plurality of wires one by one, even when the wires vary in thickness, the wires can be held securely one by one and can be soldered while heat from the wires is satisfactorily absorbed.

Further, the gel holder has a gel storing portion filled with vibration damping gel and the method further includes the step of injecting the vibration damping gel from the gel storing portion after the step of fixing the gel holder to the fixed part. According to this method, the vibration damping gel can be injected satisfactorily from the gel storing portion of the gel holder after the gel holder is mounted on the fixed part.

As has been discussed, according to the present invention, the gel holder can be mounted on the fixed part, and the heat absorbing members made of a material capable of absorbing heat and the holding members and the like are mounted on the fixed part and are brought into contact with the plurality of wires when the wires are bonded by heat of soldering and so on. It is thus possible to fix the wires while absorbing heat.

Therefore, a thermal deformation and a residual stress on the wires can be suppressed during bonding such as soldering, and variations in the effective lengths of the wires can be reduced without using another member made of a conductive adhesive and so on.

As a result, a tilt generated during the driving of the lens holder is reduced. By using the objective lens actuator, it is possible to provide the optical pickup device in which the aberration of a light beam spot is hardly reduced.

According to the present invention, the gel holder can be mounted on the fixed part. When the wires are fixed using a fixing agent such as solder, the gel holder is not mounted on the fixed part. Thus a flux and the like do not adhere over the gel holder and fixed part when solder is used, so that vibrations can be damped satisfactorily by the vibration damping gel and the lens holder can be supported in a stable state.

Further, the holding members can hold the plurality of wires one by one. Even when the wires vary in thickness, the wires can be held securely one by one and can be soldered while heat from the wires is absorbed satisfactorily.

DESCRIPTION OF THE EMBODIMENT

The present embodiment will be described below with reference to the accompanying drawings.

Figure 1:
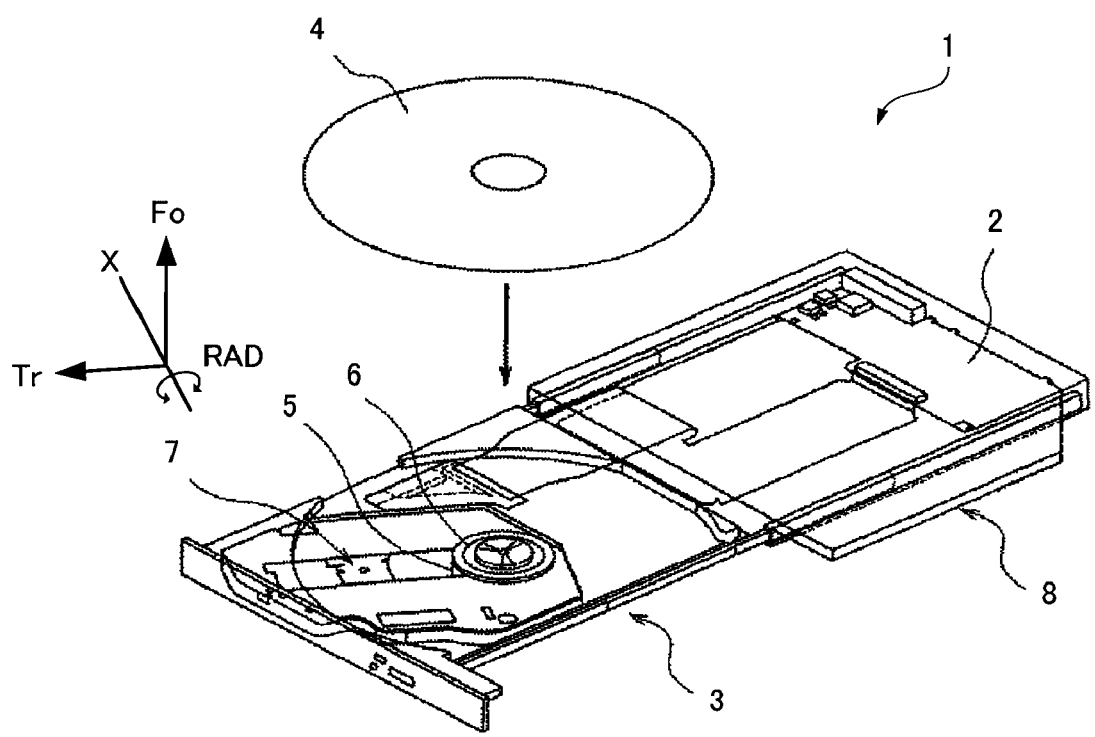
FIG. 1 is a perspective view showing an optical disk drive including an objective lens actuator according to an embodiment of the present invention.

FIG. 1 is a perspective view showing an optical disk drive including an objective lens actuator according to the present embodiment.

As shown in FIG. 1, an optical disk drive 1 is made up of a body case 8 that includes a control circuit board 2 for performing various kinds of control and a traverse unit 3 that can extend and retract from the body case 8.

The traverse unit 3 includes a spindle motor 5 for rotationally driving a disk (optical disk) 4, which is a disk-like recording medium, and an optical pickup device 7 for irradiating the disk 4 with a light beam spot to optically record and reproduce information. The disk 4 can be rotated while being chucked on a turntable 6 provided on the spindle motor 5. In the traverse unit 3, the optical pickup device 7 is disposed so as to move in a tracking direction, which is the radial direction of the disk 4, that is, in the direction of arrow Tr.

Figure 2:
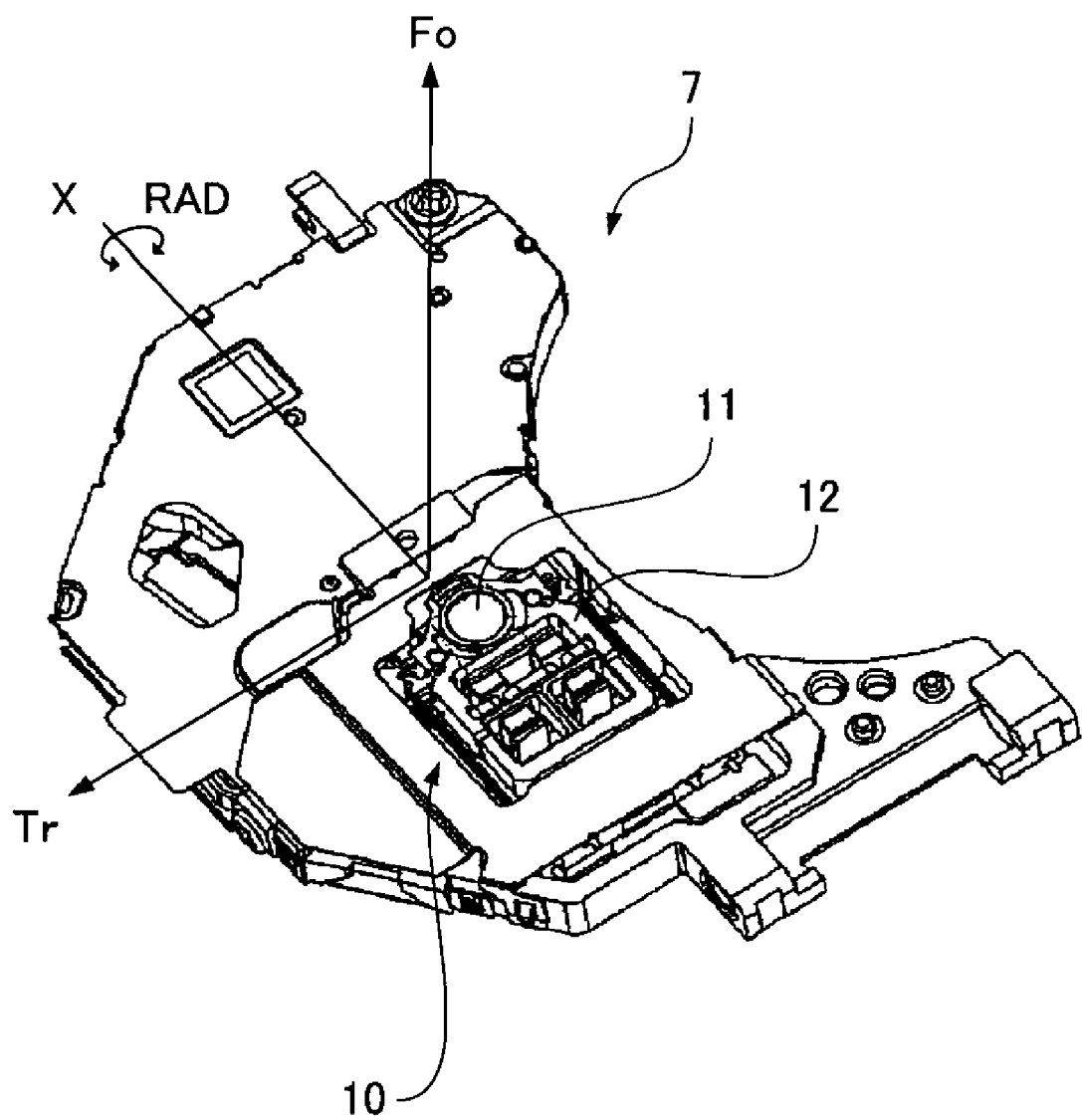
FIG. 2 is a perspective view showing an optical pickup device including the objective lens actuator.
Figure 3:
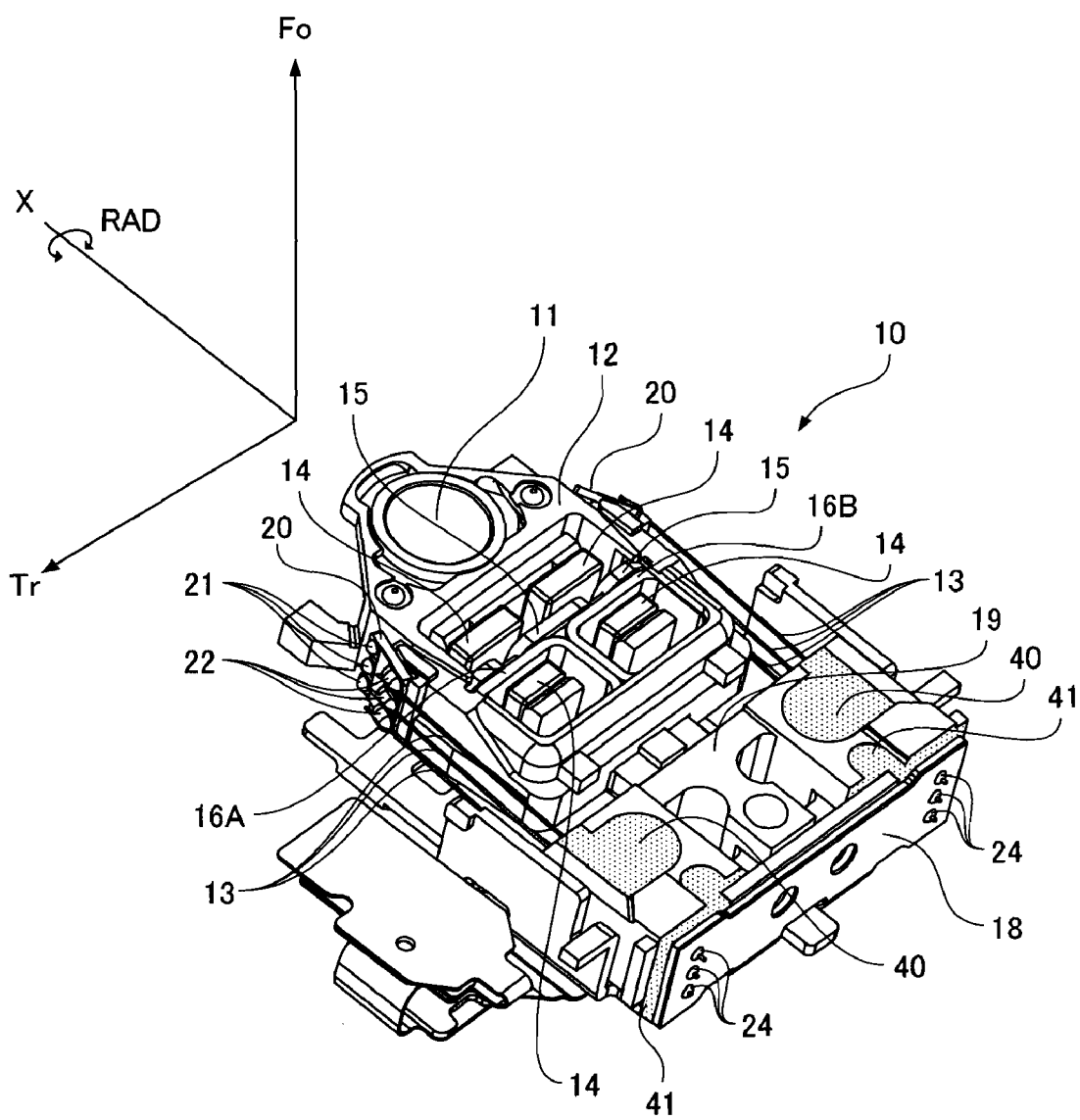
FIG. 3 is a perspective view showing the objective lens actuator.

In FIG. 1 and FIGS. 2 and 3, which will be described later, arrow Fo indicates a focusing direction for focus control on an object lens provided on the optical pickup device 7. Further, arrow RAD around the X axis (tangential direction) perpendicular to the arrow Fo direction and the arrow Tr direction is a radial tilting direction, which is the rotation control direction of an objective lens 11 provided on the optical pickup device 7.

The optical pickup device 7 of the optical disk drive 1 irradiates the disk 4 with a light beam spot through the objective lens 11 and controls the position of the objective lens 11 in the focusing direction, the tracking direction, and the radial tilting direction based on a control signal of the control circuit board 2 when information is recorded or reproduced from the disk 4.

Figure 4:
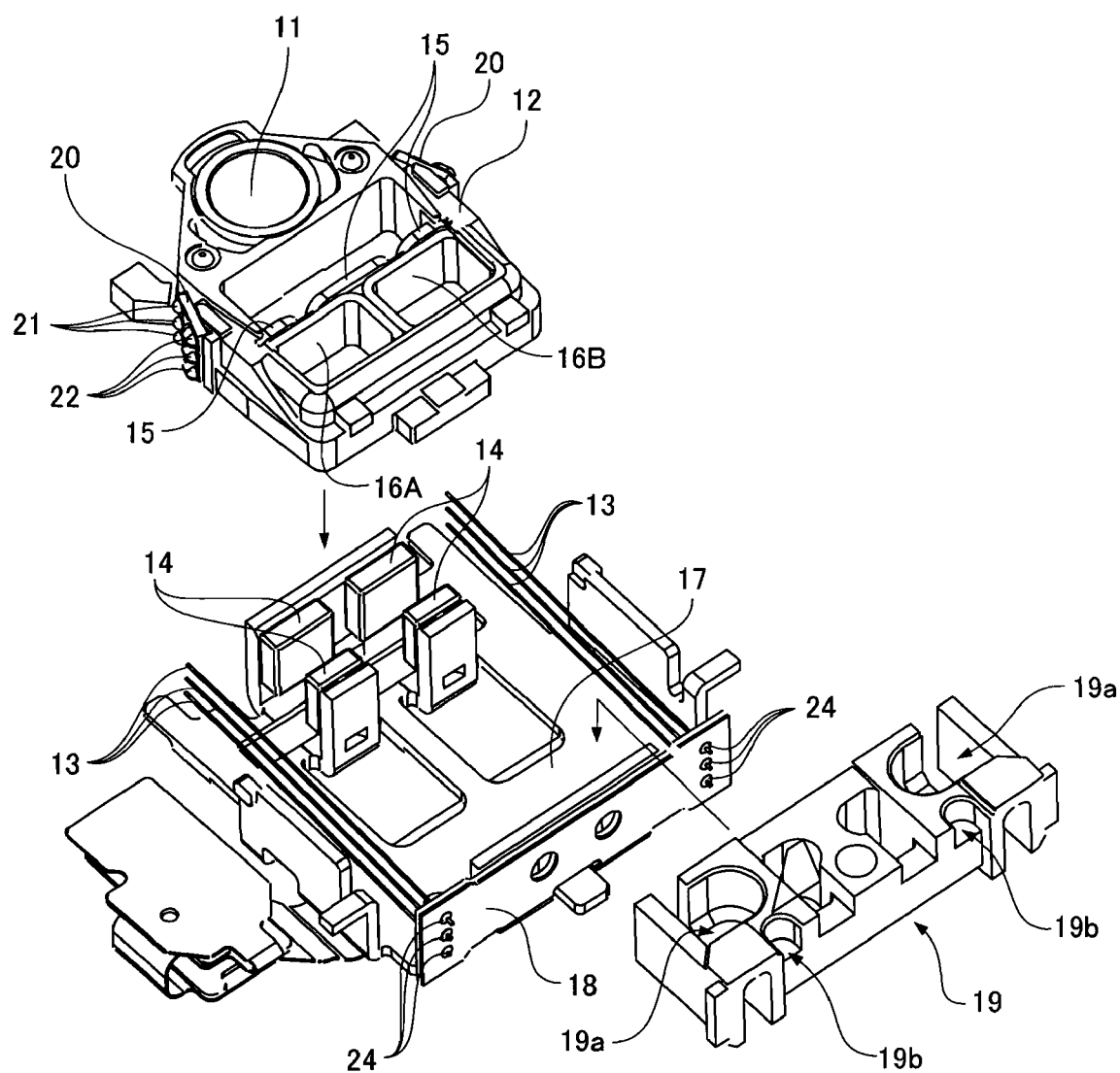
FIG. 4 is an exploded perspective view showing the objective lens actuator.

FIG. 2 is a perspective view showing an optical pickup device including the objective lens actuator according to the present embodiment. FIG. 3 is a perspective view showing the objective lens actuator. FIG. 4 is an exploded perspective view showing the objective lens actuator.

As shown in FIGS. 2 to 4, the objective lens 11 is held by a lens holder 12 and the lens holder 12 has terminal plates 20 fixed thereon. On a yoke base 17 serving as a fixed part, a fixed substrate 18 is fixed. A plurality of wires 13 serving as suspension members (three wires are provided on each side in the present embodiment), each have one end fixed by soldering with solder 24 and have the other end fixed by soldering to the terminal plates 20 with solder 22. A part including the fixed substrate 18 fixed on the yoke base 17 may act as a fixed part. As has been discussed, one end of each of the wires 13 is fixed to the fixed substrate 18 serving as a fixed part.

The objective lens 11 and the lens holder 12 are formed integrally and constitute a moving part while being supported by the fixed substrate 18 with elasticity through the wires 13. In other words, the moving part made up of the objective lens 11 and the lens holder 12 is supported with elasticity by the yoke base 17 and the fixed substrate 18, which are examples of a fixed part, the moving part being movable in the focusing direction, the tracking direction, and the radial tilting direction through the wires 13.

The lens holder 12 includes tracking coils 15, a focusing coil 16A, and a focusing coil 16B. The tracking coils 15 and the focusing coils 16A and 16B are subjected to edge line processing so as to be energized through the plurality of wires 13. In other words, the ends of the coils are brought into conduction with the solder 21 on the terminal plates 20.

As shown in FIGS. 3 and 4, a plurality of magnets 14 are attached to the yoke base 17 and the lens holder 12 is disposed such that the tracking coils 15 or the focusing coils 16A and 16B face the magnets 14. The magnets 14, the tracking coils 15, and the focusing coils 16A and 16B constitute a magnetic circuit, and the tracking coils 15 and the focusing coils 16A and 16B are fed with magnetic fluxes from the magnets 14.

As has been discussed, the objective lens actuator 10 of the present embodiment includes the objective lens 11 for focusing a light beam on the disk 4, the lens holder 12 for holding the objective lens 11, a fixed part (the yoke base 17 in this embodiment) for supporting the lens holder 12 with elasticity through the plurality of wires 13, the magnets 14 attached to the fixed part side, and the magnetic circuit having the tracking coils 15 and the focusing coils 16A and 16B which are attached to the lens holder 12. Further, the lens holder 12 and the objective lens 11 can be driven by the magnetic circuit in the focusing direction and the tracking direction.

In the operations of the objective lens actuator 10 configured thus, the moving part including the objective lens 11 and the lens holder 12 is driven in the focusing direction of arrow Fo, the tracking direction of arrow Tr, and the radial tilting direction of arrow RAD by energizing the coils. For example, when current is applied to the focusing coil 16A and the focusing coil 16B in the same direction, the moving part including the objective lens 11 is driven in the focusing direction. When the current is applied in opposite directions, the moving part is driven rotationally in the radial tilting direction.

The objective lens actuator 10 includes, in addition to the constituent elements, a gel holder 19 for holding damping gels 40 and 41 (see FIG. 3) acting as vibration damping gels for damping the primary mode vibration of the moving part. The gel holder 19 of the objective lens actuator 10 according to the present embodiment is a separate member from the yoke base 17, which is an example of a fixed part, and the gel holder 19 can be mounted on the yoke base 17 in a state in which the lens holder 12 is mounted on the yoke base 17.

Generally, in the objective lens actuator of the prior art, the gel holder parts 58 are configured with the fixed part 57 before the plurality of wires 54 are soldered, whereas the objective lens actuator 10 of the present embodiment is different in that the gel holder 19 is mounted after soldering. As in the prior art, the primary mode vibration of the moving part is damped by the action of the damping gel.

Figure 5:
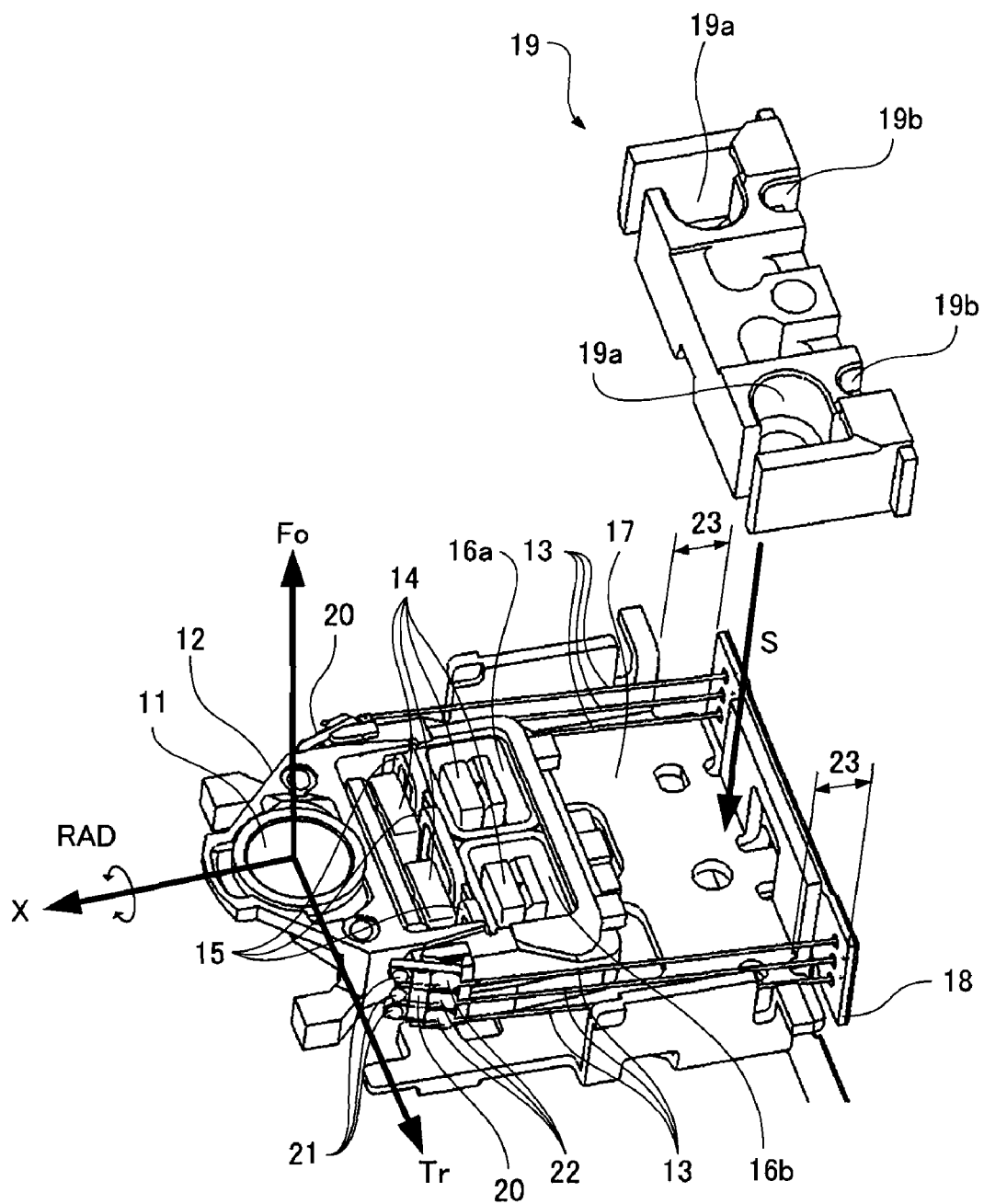
FIG. 5 is a perspective view showing the manufacturing process (the step of mounting a gel holder) of the objective lens actuator.
Figure 6:
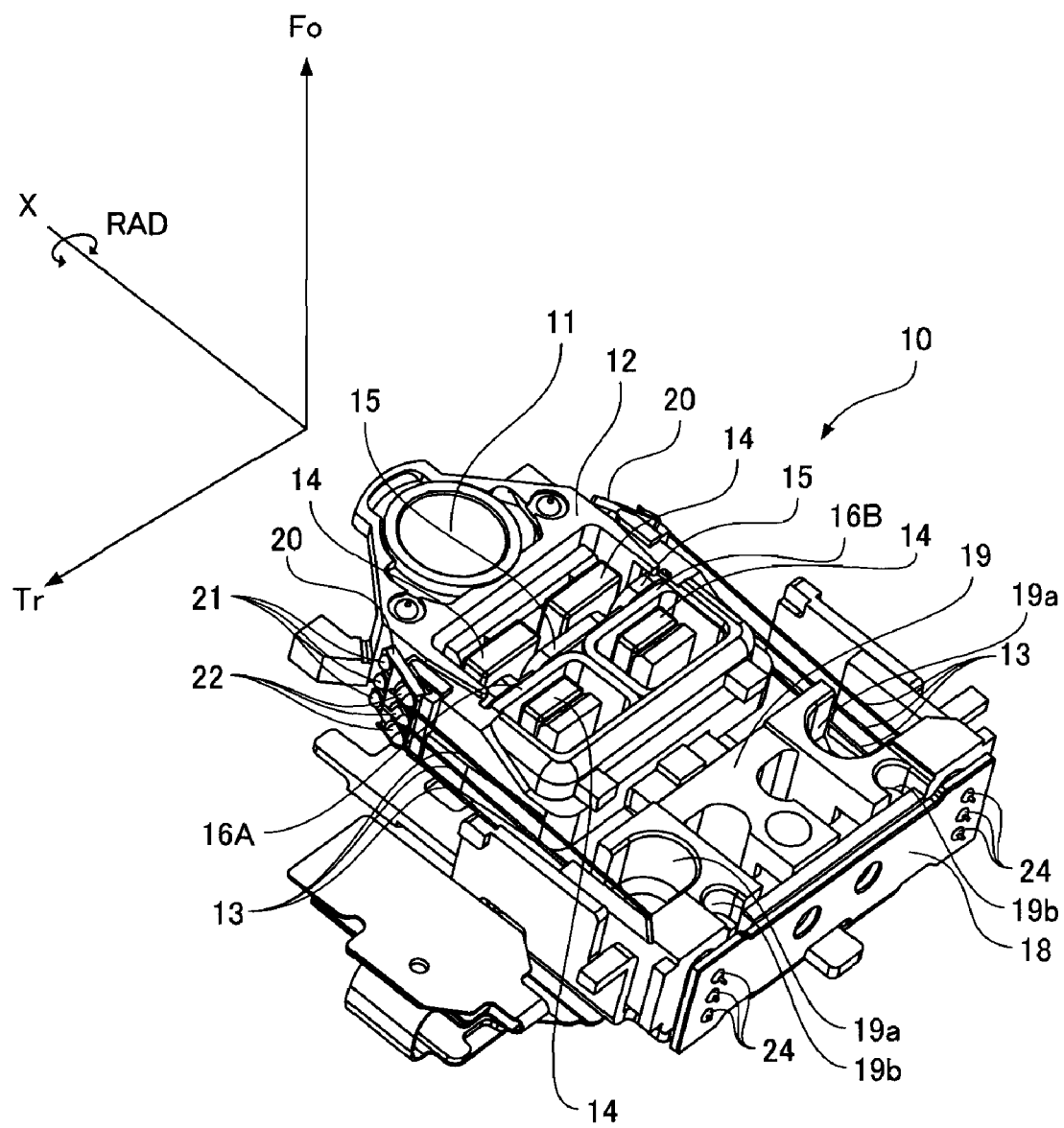
FIG. 6 is a perspective view showing a state of the objective lens actuator before damping gel is injected.

The fixation of the wires 13 by soldering will be described later. In the objective lens actuator 10 of the present embodiment, as shown in FIG. 5, after soldering of the solder 24 for fixing one end of each of the wires 13 to the fixed substrate 18 and the solder 22 for fixing the other end of each of the wires 13 to the terminal plates 20, the gel holder 19 is fixed to the yoke base 17 along arrow S. After that, the damping gels 40 and 41 are injected into pockets (gel storing portions) 19*a* and 19*b* formed as recessed portions on the gel holder 19, and the gap of the pocket 19*a* and the gap of the pocket 19*b* are filled with the damping gels 40 and 41. The damping gel 40 injected in the gap of the pocket 19*a* fills a gap between the gel holder 19 and the wires 13 so as to cover the wires 13. The damping gel 41 injected into the gap of the pocket 19*b* fills a gap between the fixed substrate 18 and the gel holder 19.

In other words, the objective lens actuator 10 of the present embodiment includes the objective lens 11 for focusing a light beam on the disk 4, the lens holder 12 for holding the objective lens 11, the yoke base 17, the fixed substrate 18, the plurality of wires 13 each having one end fixed to the lens holder 12 with a fixing agent and the other end fixed to the yoke base 17 and the fixed substrate 18, and the gel holder 19, which can be mounted on the yoke base 17 and the fixed substrate 18. The gel holder 19 is a separate member from the yoke base 17 and the fixed substrate 18 and can be mounted on the yoke base 17 and the fixed substrate 18 while the lens holder 12 is mounted on the yoke base 17 and the fixed substrate 18.

A method of manufacturing the objective lens actuator 10 according to the present embodiment, the objective lens actuator 10 including the objective lens 11 for focusing a light beam on the disk 4, the lens holder 12 for holding the objective lens 11, the yoke base 17, the fixed substrate 18, the plurality of wires 13 each having one end fixed to the lens holder 12 with a fixing agent and the other end fixed to the yoke base 17 and the fixed substrate 18, and the gel holder 19, which can be mounted on the yoke base 17 and the fixed substrate 18, includes the steps of: fixing the plurality of wires 13 to the yoke base 17, the fixed substrate 18, and the lens holder 12 in a state in which the gel holder 19 is removed from the yoke base 17 and the fixed substrate 18; and fixing the gel holder 19 to the yoke base 17 and the fixed substrate 18.

Moreover, in the objective lens actuator 10 of the present embodiment, the gel holder 19 includes the pockets 19*a* and 19*b* filled with the damping gels 40 and 41, and the damping gels 40 and 41 can be injected from the pockets 19*a* and 19*b* after the gel holder 19 is mounted on the yoke base 17 and the fixed substrate 18.

The gel holder 19 is a separate member from the fixed part (including the yoke base 17 and the fixed substrate 18) and is fixed to the fixed part after the wires 13 are soldered, and the yoke base 17 has a gap 23 shown in FIG. 5. This is because this configuration is useful for the soldering equipment of the wires 13 and the contents will be described later.

Figure 7:
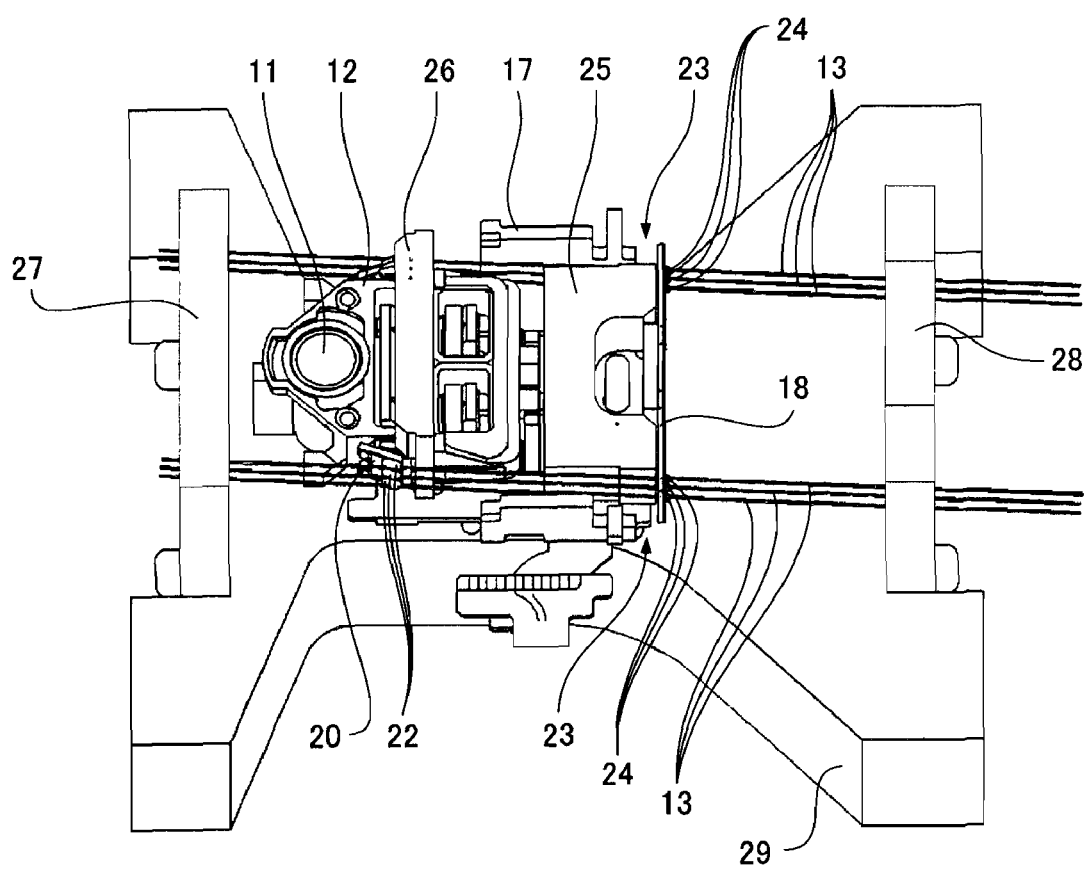
FIG. 7 is a perspective view showing the layout and so on of heat absorbing members when wires are soldered as another manufacturing process of the objective lens actuator.
Figure 8:
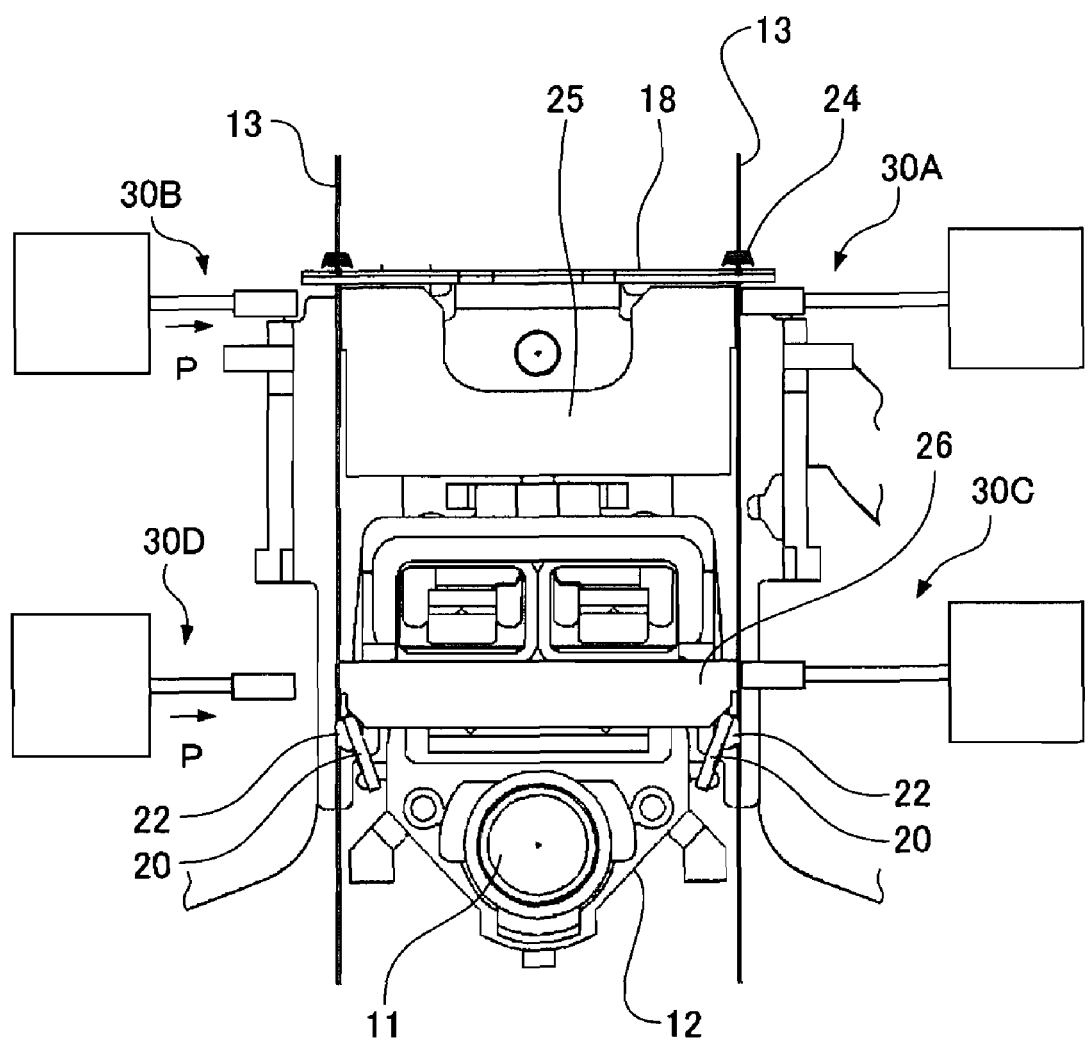
FIG. 8 is a plan view showing the layout of the heat absorbing members and holding members when the wires are soldered as another manufacturing process of the objective lens actuator.
Figure 9:
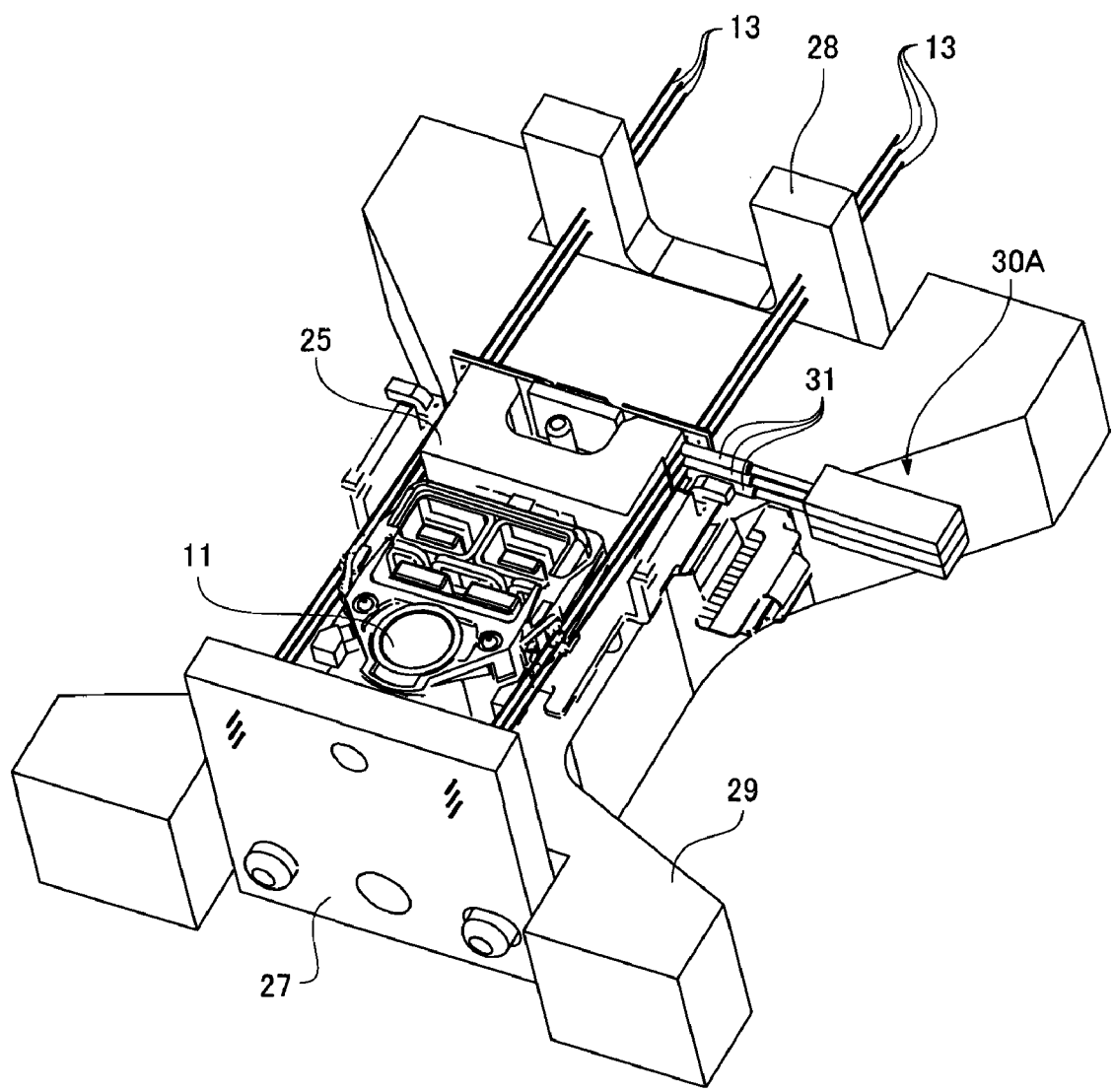
FIG. 9 is a perspective view showing a state in which the wires are held between the heat absorbing member and the holding member of the objective lens actuator (only one (30A) of the holding members is shown)

The following will describe the method of manufacturing the objective lens actuator 10 in accordance with the accompanying drawings. FIG. 7 is a perspective view showing the manufacturing process of the objective lens actuator 10 according to the present embodiment. FIG. 8 is a plan view showing the layout of heat absorbing members 25 and 26, which are shaped like blocks, and holding members 30A to 30D. The heat absorbing members 25 and 26 absorb heat from the wires 13 when the wires are soldered. FIGS. 7 and 8 show the objective lens actuator 10 being assembled. The objective lens actuator 10 is disposed in assembling equipment to solder the wires 13.

As shown in FIG. 7, the lens holder 12 and the yoke base 17 are placed on a base 29, which is a reference line, and are fixed to the reference position of the base 29. On the base 29, a wire support plate 27 and a wire support plate 28 are provided while being raised. The wire support plate 27 and the wire support plate 28 support and position the wires 13 relative to the base 29. As shown in FIG. 7, the wires 13 are longer than the wires 13 of the completed objective lens actuator 10. After soldering, the wires 13 are cut to a predetermined length with a wire cutting device (not shown).

Further, in the objective lens actuator 10, the heat absorbing member 25 for absorbing heat from the wires 13 is provided instead of the gel holder 19. The heat absorbing member 25 is fixed to the yoke base 17, which is a fixed part. Moreover, the heat absorbing member (heat absorbing block) 26 for absorbing heat from the wires 13 is provided between points near the right and left terminal plates 20. The heat absorbing members 25 and 26 are made of materials capable of absorbing heat. The heat absorbing members 25 and 26 can be attached to and detached from the base 29 in the focusing direction Fo, and both sides of the absorbing members 25 and 26 are disposed in contact with points where the solder 22 or the solder 24 is provided on the wires 13.

On both sides of the base 29 where the objective lens actuator 10 is placed, the holding members 30A to 30D are disposed to hold the wires 13 in synchronization with the heat absorbing member 26. The holding members 30A to 30D each are made up of three springs that can operate independently relative to the wires 13 and pins 31 that can be pressed by compressed air and the like. The holding members 30A to 30D hold the plurality of wires 13 with the heat absorbing member 25 and the heat absorbing member 26, near the soldering points of the solder 22 and the solder 24 (in other words, the wires 13 are held one by one by the heat absorbing member 25 or the heat absorbing member 26). In other words, the holding members 30A to 30D can hold the plurality of wires 13 one by one with the heat absorbing member 25 or the heat absorbing member 26. Thus the heat absorbing member 25 and the heat absorbing member 26 also act as second holding members for holding the wires 13 in synchronization with the holding members (first holding members) 30A to 30D. As shown in FIGS. 5 and 7, between the fixed substrate 18 and the raised sides of the yoke base 17, the gap 23 is formed on a point where the pins 31 of the holding members 30A and 30B extend and retract, so that the wires 13 can be held smoothly by the pins 31 provided on the holding members 30A and 30B.

In other words, in the objective lens actuator 10 of the present embodiment, the heat absorbing members 25 and 26 capable of holding the plurality of wires 13 with the holding members 30A to 30D can be mounted instead of the gel holder 19 on the yoke base 17 and the fixed substrate 18.

On the yoke base 17 and the fixed substrate 18 of the objective lens actuator 10 according to the present embodiment, the holding members 30A to 30D capable of holding the plurality of wires 13 one by one with the second holding members can be mounted instead of the gel holder 19.

In FIG. 8, the steps specifically are performed as follows: the holding member 30B and the holding member 30D move the pins 31 in the direction of arrow P to hold the wires 13 like the holding member 30A and the holding member 30C. At this point, the plurality of wires 13 are fixed one by one by the holding members 30A to 30D. After the wires 13 are held, the wires 13 are soldered with the solder 24 and the solder 22 while being held.

In this case, the wires 13 are pressed near the solder 24 and the solder 22, so that heat from the solders 22 and 24 can be released to the heat absorbing member 25 and the heat absorbing member 26. Thus the thermal expansion and the residual stress of the wires 13 are smaller than in the soldering method of the prior art.

In the objective lens actuator 10 of the present embodiment, solder is used as a fixing agent.

For example, when the heat absorbing members are absent with a temperature difference of 300° C. during soldering, the effective lengths of the wires 13 are changed by a thermal expansion of 30 μm to 70 μm and distortion occurs. The present invention can obtain the effect of reducing variations to several μm of a measurement error level.

At the completion of soldering, the heat absorbing members 25 and 26 also acting as holding members are removed (the heat absorbing member 25 is removed from the yoke base 17 serving as a fixed part). After that, the gel holder 19 is fixed to the yoke base 17 as has been discussed, and then the pockets 19c and 19d of the gel holder 19 are filled with the damping gels 40 and 41.

According to the foregoing configuration, the gel holder 19 is configured as a separate member from the yoke base 17 and the fixed substrate 18 which serve as fixed parts, and the gel holder 19 can be mounted on the yoke base 17 in a state in which the lens holder 12 is mounted on the yoke base 17. Thus the heat absorbing member 25 can be mounted on the yoke base 17 before the gel holder 19 is mounted on the yoke base 17 serving as a fixed part. With this configuration, during solder joining, the heat absorbing member 25 can be mounted on the yoke base 17 instead of the gel holder 19 while making contact with the plurality of wires 13.

In other words, a method of manufacturing the objective lens actuator 10 according to the present embodiment, the objective lens actuator 10 including the objective lens 11 for focusing a light beam on the disk 4, the lens holder 12 for holding the objective lens 11, the yoke base 17, the fixed substrate 18, the plurality of wires 13 each having one end fixed to the lens holder 12 with the fixing agent and the other end fixed to the yoke base 17 and the fixed substrate 18, and the gel holder 19, which can be mounted on the yoke base 17 and the fixed substrate 18, includes the steps of: allowing the heat absorbing members 25 and 26 made of a material capable of absorbing heat to be mounted instead of the gel holder 19 on the yoke base 17 and the fixed substrate 18 in a state in which the heat absorbing members 25 and 26 are in contact with the plurality of wires 13, and fixing the heat absorbing members 25 and 26 to the yoke base 17 and the fixed substrate 18; fixing the plurality of wires 13 to the yoke base 17, the fixed substrate 18, and the lens holder 12 in a state in which the heat absorbing members 25 and 26 are in contact with the plurality of wires 13; removing the heat absorbing members 25 and 26 from the yoke base 17 and the fixed substrate 18; and fixing the gel holder 19 to the yoke base 17 and the fixed substrate 18.

Moreover, a method of manufacturing the objective lens actuator 10 according to the present embodiment, the objective lens actuator 10 including the objective lens 11 for focusing a light beam on the disk 4, the lens holder 12 for holding the objective lens 11, the yoke base 17, the fixed substrate 18, the plurality of wires 13 each having one end fixed to the lens holder 12 with the fixing agent and the other end fixed to the yoke base 17 and the fixed substrate 18, and the gel holder 19, which can be mounted on the yoke base 17 and the fixed substrate 18, includes the steps of: allowing the heat absorbing members 25 and 26 for holding the plurality of wires 13 to be mounted instead of the gel holder 19 on the yoke base 17 and the fixed substrate 18, and fixing the heat absorbing members 25 and 26 to the yoke base 17 and the fixed substrate 18; fixing the plurality of wires 13 to the yoke base 17, the fixed substrate 18, and the lens holder 12 in a state in which the heat absorbing members 25 and 26 hold the plurality of wires 13; removing the heat absorbing members 25 and 26 from the yoke base 17 and the fixed substrate 18; and fixing the gel holder 19 to the yoke base 17 and the fixed substrate 18.

Further, a method of manufacturing the objective lens actuator 10 according to the present embodiment, the objective lens actuator 10 including the objective lens 11 for focusing a light beam on the disk 4, the lens holder 12 for holding the objective lens 11, the yoke base 17, the fixed substrate 18, the plurality of wires 13 each having one end fixed to the lens holder 12 with the fixing agent and the other end fixed to the yoke base 17 and the fixed substrate 18, and the gel holder 19, which can be mounted on the yoke base 17 and the fixed substrate 18, includes the steps of: allowing the heat absorbing members 25 and 26 for holding the plurality of wires 13 to be mounted instead of the gel holder 19 on the yoke base 17 and the fixed substrate 18, and fixing the heat absorbing members 25 and 26 to the yoke base 17 and the fixed substrate 18; fixing the plurality of wires 13 to the yoke base 17, the fixed substrate 18, and the lens holder 12 in a state in which the heat absorbing members 25 and 26 hold the plurality of wires 13 one by one; removing the heat absorbing members 25 and 26 from the yoke base 17 and the fixed substrate 18; and fixing the gel holder 19 to the yoke base 17 and the fixed substrate 18.

In the method of manufacturing the objective lens actuator 10 according to the present embodiment, the gel holder 19 includes the pockets 19a and 19b filled with the damping gels 40 and 41, and the step of injecting the damping gels 40 and 41 from the pockets 19a and 19b is provided after the step of fixing the gel holder 19 to the yoke base 17 and the fixed substrate 18.

Thus it is possible to fix the wires 13 in contact with the heat absorbing members 25 and 26 while absorbing heat, so that a thermal deformation and a residual stress on the wires 13 can be suppressed during soldering and variations in the effective lengths of the wires can be reduced without using another member made of a conductive adhesive and so on. As a result, a tilt generated during the driving of the lens holder 12 is reduced. By using the objective lens actuator 10, it is possible to provide the optical pickup device 7 in which the aberration of a light beam spot is reduced.

According to the foregoing configuration, the plurality of wires 13 are pressed and held one by one with elasticity. Thus even when the wires 13 have different diameters or the diameters are varied by a manufacturing error and so on, the differences and variations can be absorbed by the pins 31 of the holding members 30A to 30D, achieving high heat absorption and stable assembling.

Figure 10A:
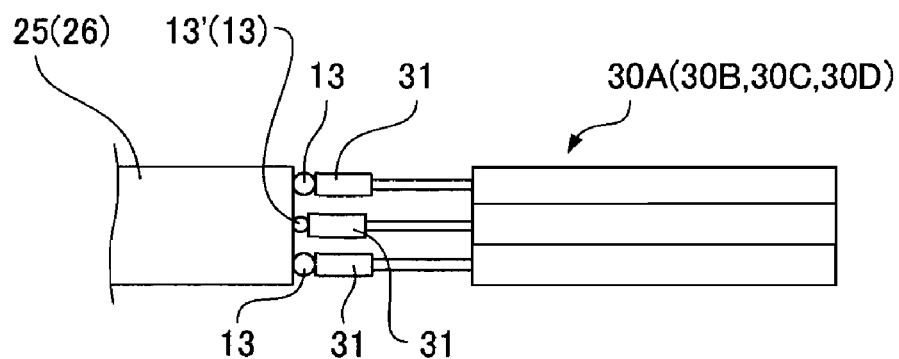
FIG. 10A shows a state in which the wires are held by the holding members according to the embodiment of the present invention in the manufacturing process of the objective lens actuator.
Figure 10B:
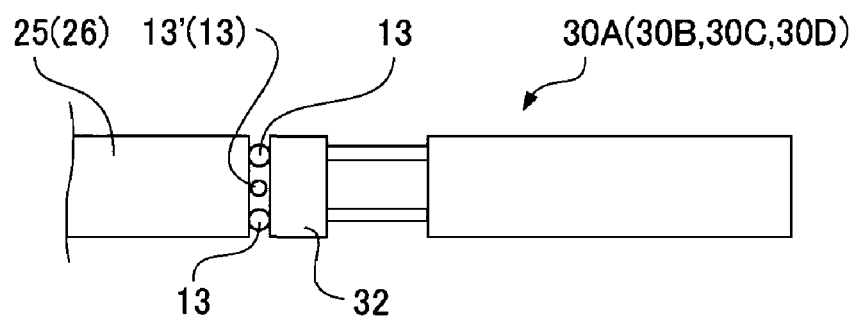
FIG. 10B shows a state in which the wires are held by the holding members as a comparative example in the manufacturing process of the objective lens actuator.

In other words, as shown in FIG. 10B, when the holding members 30A to 30D collectively press the plurality of wires 13 (e.g., three wires) with a single pin 32 which is extendable and retractable, variations in the diameters of the wires 13 generate gaps between a thin wire 13' (the central wire 13 in FIGS. 10A and 10B) and the pin 32 and the heat absorbing member 25 (or the heat absorbing member 26). Thus the heat absorbing member 25 (or the heat absorbing member 26) is not in contact with the thin wire 13' and heat is not satisfactorily absorbed. Further, the thin wire 13' can move in a space between the pin 32 and the heat absorbing member 25 (or the heat absorbing member 26) and thus the thin wire 13' cannot be positioned with accuracy.

Unlike in the foregoing configuration, in the objective lens actuator 10 of the present embodiment, the holding members 30A to 30D include the pins 31, which are extendable and retractable, for the respective wires 13 as shown in FIG. 10A, and the pins 31 respectively hold the wires 13. Thus even in the event of variations in the diameters of the wires 13, the wires 13 can be held reliably by the pins 31. Thus the heat absorbing member 25 (or the heat absorbing member 26) and the pins 31 satisfactorily can be brought into contact with each other and heat conducted to the wires 13 satisfactorily can be absorbed by the heat absorbing member 25 (or the heat absorbing member 26) during soldering.

Further, since the wires 13 can be held securely, the wires 13 can be fixed securely during soldering and the wires 13 can be soldered with precise positioning, thereby improving reliability.

Moreover, the foregoing configuration can solve the following problem: when the wires 13 are fixed by soldering, the gel holder 19 is not mounted on the yoke base 17, which is a fixed part, and thus a flux and the like are scattered during soldering and are placed with adhesion between the gel holder 19 and the fixed substrate 18 and between the gel holder 19 and the yoke base 17, so that the vibration damping characteristics are degraded.

Figure 11A:
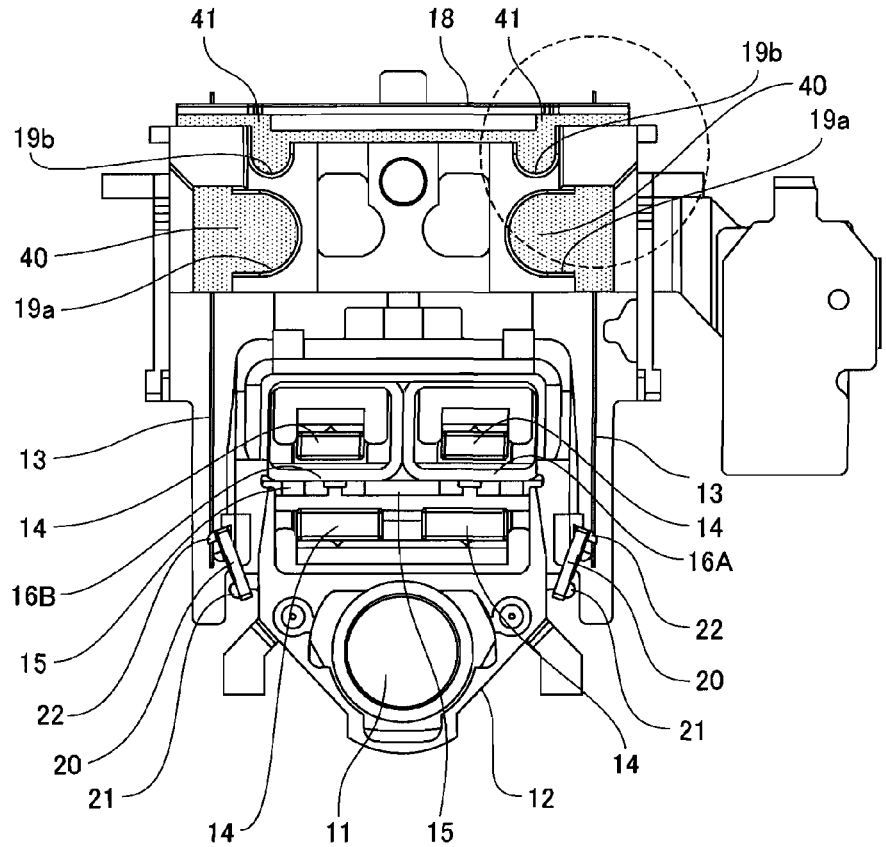
FIG. 11A is a plan view showing the objective lens actuator after the damping gel is injected.
Figure 11B:
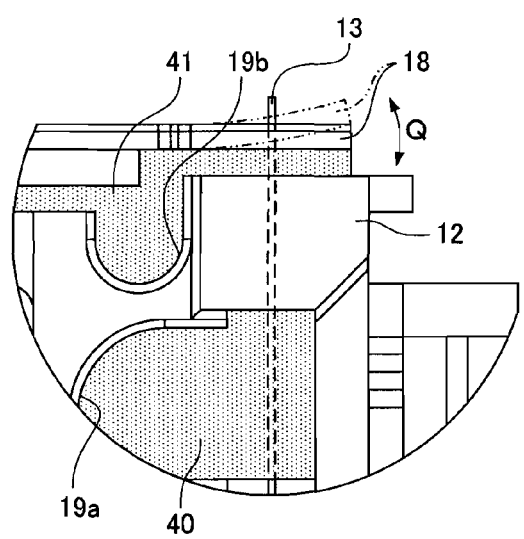
FIG. 11B is an enlarged plan view around pockets shown in FIG. 11A.
Figure 12:
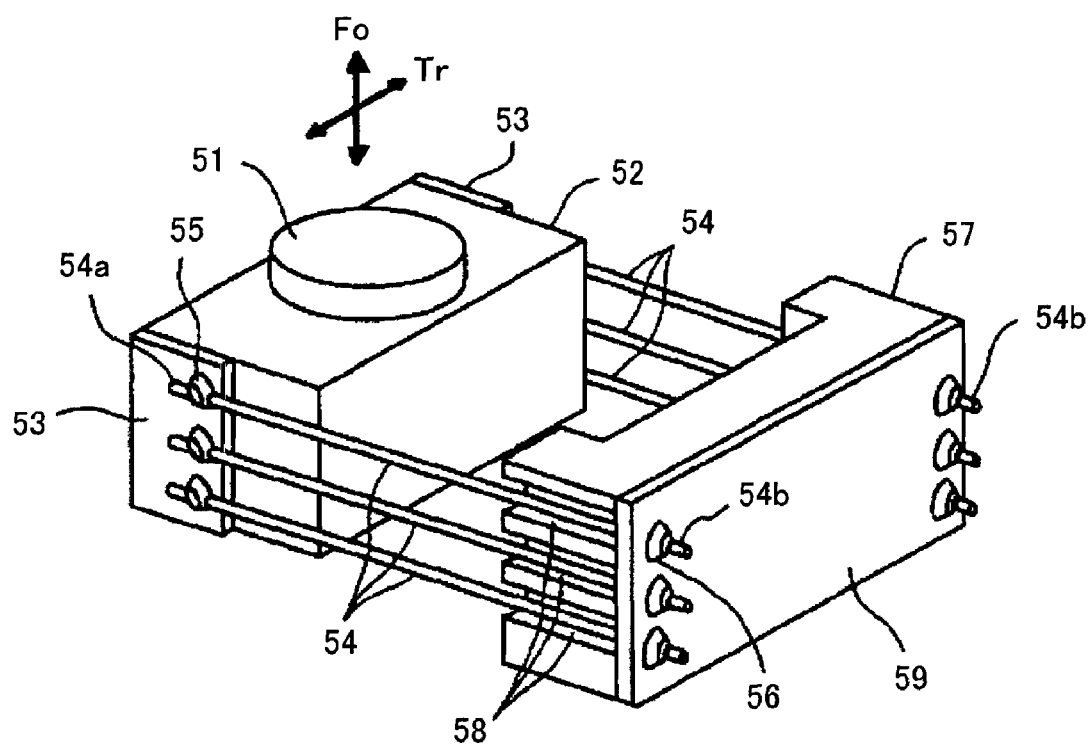
FIG. 12 is a perspective view showing a typical objective lens actuator according to the prior art.

The following will describe the vibration damping characteristics in detail. FIG. 11A is a plan view showing the objective lens actuator 10 after the damping gel is injected. FIG. 11B is an enlarged plan view around the pockets 19a and 19b of FIG. 11A. A hatched part of FIG. 11B shows the injected damping gels 40 and 41. The damping gels 40 and 41 are filled between the gel holder 19 and the fixed substrate 18 and between the gel holder 19 and the yoke base 17. In this case, the yoke base 17 is made of an iron material, whereas the fixed substrate 18 is made up of a glass epoxy substrate. Thus the fixed substrate 18 is deformed with a smaller force than the yoke base 17.

Unnecessary vibrations generated on the objective lens 11 and the lens holder 12 slightly deform the fixed substrate 18 in the direction of arrow Q of FIG. 11B with a force generated through the wires 13. In other words, the fixed substrate 18 is bent mainly at a joint with the yoke base 17. In the case where the damping gel 41 is injected, the deformation is absorbed by the damping gel 41, so that unnecessary vibrations generated on the objective lens 11 and the lens holder 12 can be damped and absorbed.

However, when a soldering flux adheres between the fixed substrate 18 and the gel holder 19, the flux completely fixes the fixed substrate 18 and the gel holder 19, so that the fixed substrate 18 cannot be bent. Thus the vibration damping effect is spoiled.

In other words, between the gel holder 19 and the fixed substrate 18, the damping gel 41 is filled and a flux and the like are not disposed. Thus the fixed substrate 18 can vibrate relatively freely relative to the gel holder 19, so that vibrations to the wires 13 can be damped satisfactorily. Further, between the gel holder 19 and the yoke base 17, the damping gel 40 is filled and a flux and the like are not disposed. Thus the gel holder 19 can vibrate relatively freely relative to the yoke base 17, so that vibrations to the wires 13 can be damped satisfactorily.

As has been discussed, the objective lens actuator and the method of manufacturing the same according to the present embodiment can reduce a deformation and a residual stress, which are caused by heat of soldering, on the wires 13, thereby reducing variations in the effective lengths of the wires 13.

In the foregoing embodiment, the wires 13 are held between the holding members 30A and 30B acting as first holding members and the heat absorbing member 25 also acting as a second holding member. The second holding member is not limited to the heat absorbing member 25. For example, the second holding member may be configured such that a member capable of absorbing heat is brought into contact with a simply holdable component to transfer and absorb heat.

In the foregoing embodiment, solder is used as a fixing agent for fixing the wires 13. The same configuration and method are applicable to a fixing agent other than solder as long as heat can be applied during bonding.

The objective lens actuator of the present invention is not limited to the objective lens actuator of an optical disk drive. The present invention is also applicable to an objective lens actuator used for a precise optical instrument and is also useful for an optical precision instrument such as a camera and a microscope which require tracking of a lens position with high accuracy.

What is claimed is:

1. An objective lens actuator comprising:
   an objective lens for focusing a light beam on a disk;
   a lens holder for holding the objective lens;
   a fixed part;
   a plurality of wires each having one end fixed to the lens holder with a fixing agent and an other end fixed to the fixed part; and a gel holder which can be mounted on the fixed part,
wherein the gel holder is a separate member from the fixed part and can be mounted on the fixed part in a state in which the lens holder is mounted on the fixed part, and
the fixed part has a heat absorbing member mountable instead of the gel holder on the fixed part in a state in which the heat absorbing member is in contact with the plurality of wires, the heat absorbing member being made of a material capable of absorbing heat.

2. An objective lens actuator comprising:
an objective lens for focusing a light beam on a disk;
a lens holder for holding the objective lens;
a fixed part;
a plurality of wires each having one end fixed to the lens holder with a fixing agent and an other end fixed to the fixed part; and
a gel holder which can be mounted on the fixed part,
wherein the gel holder is a separate member from the fixed part and can be mounted on the fixed part in a state in which the lens holder is mounted on the fixed part, and
the fixed part has a first holding member mountable instead of the gel holder on the fixed part, the first holding member being capable of holding the plurality of wires with a second holding member.

3. An objective lens actuator comprising:
an objective lens for focusing a light beam on a disk;
a lens holder for holding the objective lens;
a fixed part;
a plurality of wires each having one end fixed to the lens holder with a fixing agent and an other end fixed to the fixed part; and
a gel holder which can be mounted on the fixed part,
wherein the gel holder is a separate member from the fixed part and can be mounted on the fixed part in a state in which the lens holder is mounted on the fixed part, and
the fixed part has a first holding member mountable instead of the gel holder on the fixed part, the first holding member being capable of holding the plurality of wires one by one with a second holding member.

4. A method of manufacturing an objective lens actuator, the objective lens actuator comprising:
an objective lens for focusing a light beam on a disk;
a lens holder for holding the objective lens;
a fixed part;
a plurality of wires each having one end fixed to the lens holder with a fixing agent and an other end fixed to the fixed part; and
a gel holder, which can be mounted on the fixed part,
the method comprising the steps of:
allowing a heat absorbing member made of a material capable of absorbing heat to be mounted instead of the gel holder on the fixed part in a state in which the heat absorbing member is in contact with the plurality of wires, and fixing the heat absorbing member to the fixed part;
fixing the plurality of wires to the fixed part and the lens holder in a state in which the heat absorbing member is in contact with the plurality of wires;
removing the heat absorbing member from the fixed part; and
fixing the gel holder to the fixed part.

5. A method of manufacturing an objective lens actuator, the objective lens actuator comprising:
an objective lens for focusing a light beam on a disk;
a lens holder for holding the objective lens;
a fixed part;
a plurality of wires each having one end fixed to the lens holder with a fixing agent and another end fixed to the fixed part; and
a gel holder, which can be mounted on the fixed part,
the method comprising the steps of:
allowing a holding member for holding the plurality of wires to be mounted instead of the gel holder on the fixed part, and fixing the holding member to the fixed part;
fixing the plurality of wires to the fixed part and the lens holder in a state in which the holding member holds the plurality of wires;
removing the holding member from the fixed part; and
fixing the gel holder to the fixed part.

6. A method of manufacturing an objective lens actuator, the objective lens actuator comprising:
an objective lens for focusing a light beam on a disk;
a lens holder for holding the objective lens;
a fixed part;
a plurality of wires each having one end fixed to the lens holder with a fixing agent and another end fixed to the fixed part; and
a gel holder, which can be mounted on the fixed part,
the method comprising the steps of:
allowing a holding member for holding the plurality of wires to be mounted instead of the gel holder on the fixed part, and fixing the holding member to the fixed part;
fixing the plurality of wires to the fixed part and the lens holder in a state in which the holding member holds the plurality of wires one by one;
removing the holding member from the fixed part; and
fixing the gel holder to the fixed part.

* * * * *